R. A. SCHOENBERG.
MECHANICAL MOVEMENT.
APPLICATION FILED JULY 24, 1909.
943,274.
Patented Dec. 14, 1909.
2 SHEETS—SHEET 1.
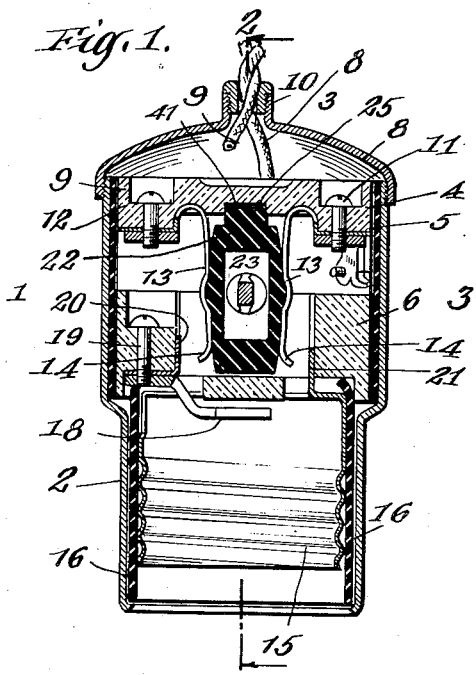
Fig. 1.
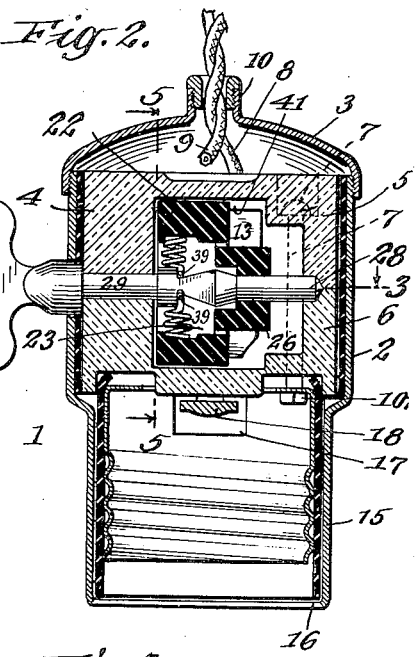
Fig. 2.
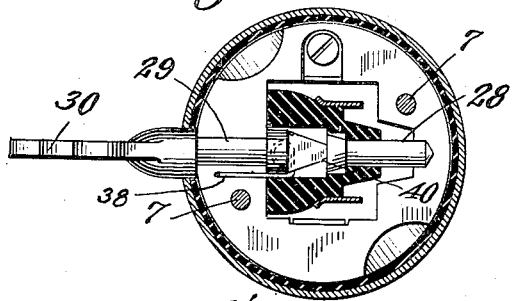
Fig. 3.
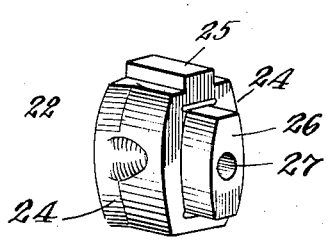
Fig. 4.
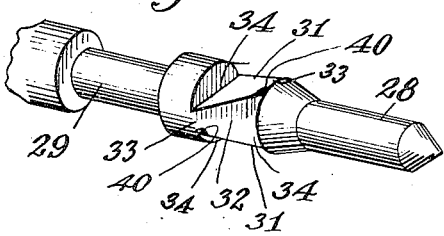
Fig. 6.
Fig. 7.
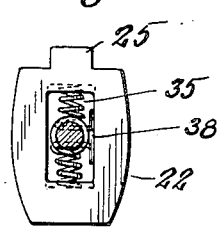
Fig. 5.
WITNESSES:
H. Crocheron
R. Menk
INVENTOR
Ralph A. Schoenberg
BY
Alan M. Johnson
ATTORNEY

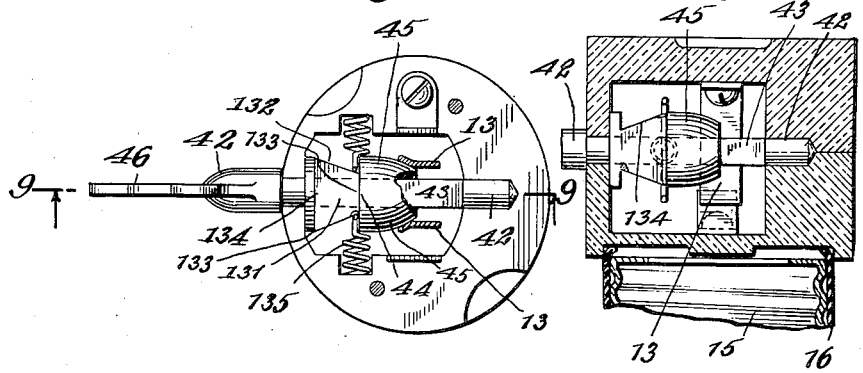
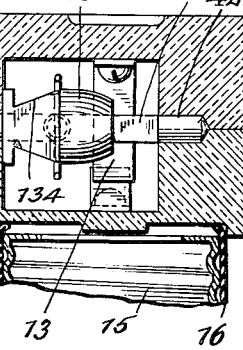
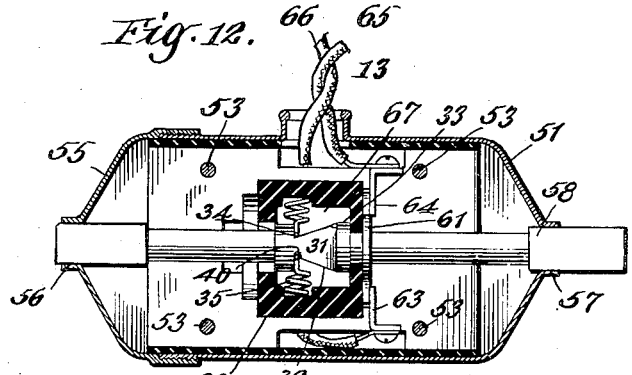
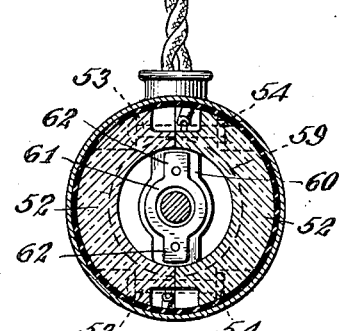
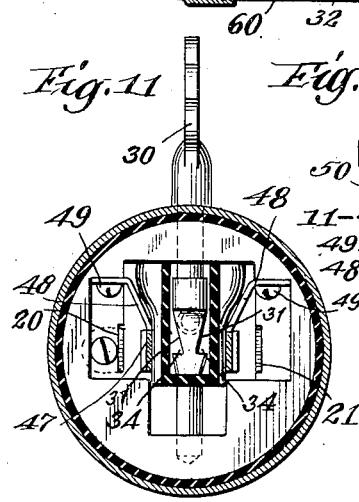
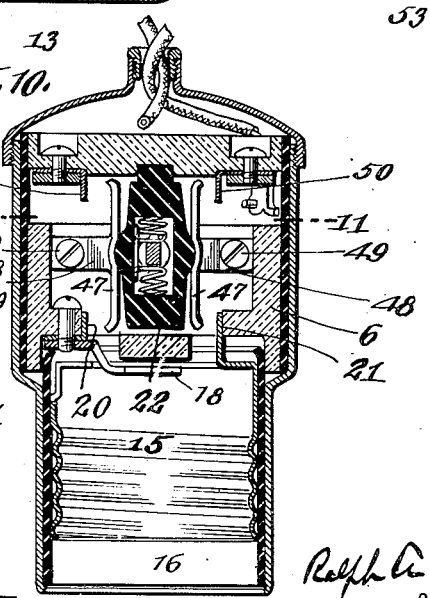

UNITED STATES PATENT OFFICE.

RALPH A. SCHOENBERG, OF NEW YORK, N. Y., ASSIGNOR TO IDA S. ROSENHEIM, OF NEW YORK, N. Y.

MECHANICAL MOVEMENT.

943,274.

Specification of Letters Patent. Patented Dec. 14, 1909.

Application filed July 24, 1909. Serial No. 509,254.

*To all whom it may concern:*

Be it known that I, RALPH A. SCHOENBERG, a citizen of the United States, and a resident of the city of New York, in the county and State of New York, have invented certain new and useful Improvements in Mechanical Movements, of which the following is a specification, taken in connection with the accompanying drawings, which form a part of the same.

This invention relates to mechanical movements adapted for universal application. It is particularly adapted to make and break electrical contacts in a quick and positive manner. In such devices as for instance in electric light sockets or in push buttons, it operates as a switch, though my invention is not to be limited to such uses.

In the accompanying drawings showing illustrative embodiments of this invention and in which the same reference numerals refer to similar parts in the several figures, Figure 1 is a longitudinal vertical section through an electric light socket equipped with my invention; Fig. 2 is a longitudinal vertical section on line 2—2 of Fig. 1; Fig. 3 is a horizontal section substantially on line 3—3 of Fig. 2; Fig. 4 is a perspective view of the driven member; Fig. 5 is a detail sectional view on the line 5—5 of Fig. 2; Fig. 6 is a perspective view of the driving member with the omission of the handle; Fig. 7 is a perspective view of one form of the intermediate compression member; Fig. 8 is a horizontal section through an electric light socket showing a modified form of my invention; Fig. 9 is a vertical section substantially on line 9—9 of Fig. 8; Fig. 10 is a vertical section through an electric light socket equipped with a modified form of my invention; Fig. 11 is a horizontal section substantially on line 11, 11 of Fig. 10; Fig. 12 is a longitudinal vertical section showing my invention applied to a push button; Fig. 13 is a transverse vertical section on the line 13—13 of Fig. 12.

For purposes of illustration I have shown my invention applied as a switch in an electric light socket or push button, but it is to be distinctly understood, as previously noted, that my invention is not to be limited to such use.

In the illustrative embodiments of the invention shown, 1 is an electric light socket provided with an outer shell 2 and a cap 3 of usual construction. In the enlarged upper portion of the shell 2 I mount a body portion 4 of any suitable construction, but which for purposes of economical manufacture I preferably form it of two blocks or similar members 5 and 6 connected together by any suitable means such as by screws 7, 7 and nuts 107, as shown in dotted lines in Fig. 2, the screws 7, 7 being shown in section in Fig. 3. These blocks may be formed of any suitable material but preferably of porcelain or some other non-conducting material.

The feed wires 8 and 9 are passed through the neck 10 of the cap 3 in the usual manner and are electrically connected to the posts 11 and 12 in any suitable manner. Each of these posts in the preferred form of my invention is electrically connected with a conducting member 13 which in the form illustrated consists of a downwardly extending yielding member or arm having an end 14.

The lower block 6 carries the side or shell contact 15 which is insulated from the shell 2 by any suitable insulation 16. This shell contact 15 has a cut away portion 17, Fig. 2, through which extends the center contact 18; the other end of this contact 18 is secured to the block 6 by any means such as by a screw 19, which also holds a contacting plate 20 in position to make electrical contact with the end 14 of one of the arms 13. The shell contact 15 is also provided with an upwardly extending arm or finger 21 which is adapted to make electrical contact with the surface 14 of the other arm 13, Fig. 1.

Between the arms 13, 13 which are preferably formed of some conducting spring yielding material, I mount the driven member 22, which may be given various shapes or configurations, depending upon the work it is to perform. As here shown, more particularly in Figs. 1 and 4, it comprises a hollow tapering or substantially wedge shaped member having an interior recess 23, inclined sides 24, 24, a head 25 and a reduced extension 26 provided with an opening 27 for the passage of the end 28 of the driving member 29, Figs. 2, 3 and 6. This driving member, as shown in this form of my invention, comprises an arbor or axle having an enlarged head or key 30 which extends on the outside of the electric light socket permitting the operator to rotate the driving member 29 to make and break the electrical contacts in the socket in the manner to be now described. On this driving member 29 I preferably mount an integral member provided with oppositely inclined surfaces forming "hills and valleys", or I may make the member on which the hills and valleys are mounted a separate one and spline or otherwise mount it upon the driving member 29, such for instance as shown in Figs. 8 and 9. In the preferred form I provide the driving member 29 with oppositely inclined surfaces 31 and 32, Fig. 6. It will be seen that the pitch of these surfaces 31 and 32 alternate forming adjacent "hills" 33 and "valleys" 34.

Within the hollow recess 23 of the driven member 22, I mount an intermediate compression member which may be given various forms and contours. As shown in the drawings this intermediate compression member (Fig. 7) is a compression coil spring 35 having ends 36, 37, a yoke 38, and arms 39, 39 which are preferably, though not necessarily, arranged above the axis of the coils of the spring. The coils on each side of the arms 39, 39 are preferably oppositely coiled as shown. This compression member 35 is mounted within the driven member 22 and moves with it in the form of my invention now being described. In mounting this spring the offset arms 39, 39 are caused to contact on opposite sides of the driving member 29, the arrangement being such that these arms 39, 39 will bear upon the opposite surfaces 31, 31 or 32, 32, as the case may be, it being understood that in the form shown there are two surfaces 31 and 32 arranged diametrically opposite each other.

It is obvious that if the arms 39, 39 lie in the valleys 34, 34 of the incline surfaces 31, 31, that a rotation of 90° of the driving member 29 will cause the member 35 to be compressed until the arms 39, 39 are brought into contact with the "hills" 33, 33, when the coils of the spring, attempting to expand into their normal position, will cause the arms 39, 39 to move down the incline wedge surfaces 32, 32 or 31, 31, until they come into the opposite valleys 34, 34, in which position the compression member 35 is in its normal state. It is obvious that if the driving member 29 is held from longitudinal movement that this alternative movement of the arms 39, 39 up and down the surfaces 31, 31 and 32, 32 will of necessity cause the driven member 22 to have a limited longitudinal reciprocating movement on the driving member 29. In this form of my invention this movement is used to alternately force the ends 14, 14 of the arms 13, 13 into contact with the electrical contacts 20 and 21 to connect the lamp (not shown) with the feed wires. When the parts are in this position another turn upon the handle 30, attached to the driving member 29, sufficient to make that member rotate 90° will cause the driven member 22 to assume its other or inoperative position such as shown in Figs. 1 and 2. This forms a very quick make and break and has been found to be extremely efficacious in use. It is also to be noted that the intermediate compression member 35 is between the driving member 29 and the driven member 22 and cannot become stretched or inoperative until the material of the member 35 itself is worn out. This is due to the fact that every quarter revolution of the driving member 29 stores up energy in the intermediate compression member 35 which energy is immediately utilized to either make or break the electrical contacts as the case may be. The energy of this member is therefore renewed on every quarter revolution of the driving member which is particularly advantageous as it prevents the member becoming stretched or otherwise inoperative after a limited use.

To assist the action of the arms 39, 39, down the respective surfaces 31 and 32, I preferably, though not necessarily, cut away or notch the surfaces as shown at 40, 40 (Figs. 3 and 6). These notches 40, 40 serve to make the action of the member 35 more sensitive in that the notches 40, 40 will permit one of the arms 39 to move slightly down the incline surfaces 31, 31 or 32, 32 as the case may be, and this action, though extremely slight, tends to drag the other arm 39 down the inclined surfaces and in that manner move the driven member 22.

The limited longitudinal movement of the driven member 22 upon the driving member 29 is preferably guided by means of the head 25 being guided in the slot 41 in the upper block 5 (see Figs. 1 and 2).

In the first form of my invention, that just described, the driven member is simply provided with surfaces to operate upon the arms 13, 13 so as to make or break the electrical contacts in the lamp. This driven member, however, may in some instances be itself provided with the oppositely inclined wedge surfaces so that the hills and valleys previously described would be on the driven member. Such a construction is shown in Figs. 8 and 9, wherein the driving member 42 is provided intermediate of its ends with a non-circular or squared portion 43 upon which slides a driven member 44 provided with a non-circular interior bore to coöperate with the non-circular or squared surface 43 on the driving member 42. This driven member 44 is provided with incline or wedge surfaces 45 to coöperate with the arms 13, 13, so as to make and break the electrical contacts such as shown for instance in Fig. 1. The driven member is also provided with oppositely incline wedge surfaces 131, 132 forming valleys 134 and hills 133 upon which bears a compression member 135 similar to that shown in Fig. 7. In this construction, unlike in the other construction, the compression member 135 is carried by the lamp socket, or other similar support, and does not move with the driven member.

It is apparent that a quarter revolution upon the handle 46 of the driving member 42 will cause the arms to move down the incline surfaces 131 or 132, as the case may be, which will cause the driven member 44 to reciprocate upon the driving member 42 and operate the arms 13, 13 to make or break the electric circuit in the manner previously described, in connection with the structure shown in Fig. 1.

I may use a different form of electrical connection to connect the feed wires with the contacts carried respectively by the center and shell contacts. For instance I may use in place of the arms 13, 13, Fig. 1, plates 47, 47, Figs. 10 and 11, which are supported by means of ears 48, 48, which in turn are secured to the block 6 by means of screws or other fastening means 49, 49. These plates 47 are formed of any conducting material and when pressed laterally by the driven member 22, both ends of each plate make connection between contacts 50, 50 and the contacts 20 and 21, as shown in Figs. 10 and 11. By this construction a double, quick make and break is obtained and one which has been found to be extremely satisfactory in use.

My invention is further adapted to change reciprocating into rotary motion, being the reverse of that previously described. In applying this principle to this particular art, to which, however, it is not to be limited, the invention is of particular advantage in what is known as push buttons.

An example of such an application of my invention is shown in Figs. 12 and 13. In this form of my invention the shell 51 incloses two semi-cylindrical insulating blocks 52, 52, secured together by any suitable means, such as by screws 53, 53 and nuts 54, 54, shown in dotted lines in Fig. 13. The end of the shell 51 is closed by means of a cap 55 which is provided with a central non-circular aperture 56 in alinement with a similar preferably non-circular aperture 57 in the shell 51 for the reception of a centrally disposed driving member 58 which extends on the outside of the shell 51 and cap 55 a sufficient distance to be pressed by the finger of the operator to enable the driving member 58 to be reciprocated. The ends of this driving member 58 are preferably formed non-circular to coöperate with the non-circular apertures 56 and 57 to prevent the rotation of said driving member 58.

I preferably form in the blocks 52, 52 complementary recesses to make a guide 59 (shown in dotted lines in Fig. 13) within which rotates the driven member 60 on one face of which is mounted a switch plate 61 having arms 62, 62 to alternately engage with contacts 63, 64 in contact with the feed wires 65, 66.

Within the driven member 60 I mount the same compression member 35 which in this form is carried by and supported within the recess 67 formed in the driven member 60. The driving member 58 is for a portion of its length, that lying within the driven member, provided with oppositely inclined surfaces 31, 32, forming valleys 34 and hills 33, the same as shown in Fig. 6. I also preferably notch the driving member forming notches 40, 40 as shown in said figure for the same purpose as described in connection with the driving member 29, Fig. 6.

By reciprocating the driving member 58 the compression member is caused to move along the incline surfaces 31, 32 which will cause the driven member 60 to rotate carrying with it the plate 61 which will alternately engage and disengage with the contacts 63 and 64 in an obvious manner.

Having thus described this invention in connection with the illustrative embodiments thereof to the details of which I do not desire to be limited, what is claimed as new and what it is desired to secure by Letters Patent is set forth in the appended claims:

1. In a mechanical movement, a driving and driven member, one adapted to have limited movement with relation to the other, oppositely inclined surfaces upon one of the members forming hills and valleys, and a compression member adapted to operate upon said oppositely inclined surfaces to actuate the driven member.

2. In a mechanical movement the combination of a driving member, a plurality of oppositely inclined surfaces forming hills and valleys adapted to be operated by said driving member, a driven member, and a compression member adapted to slide on the oppositely inclined surfaces to move the driven member.

3. In a mechanical movement the combination of a driving member, a plurality of oppositely inclined surfaces forming hills and valleys mounted on and adapted to be operated by said driving member, a driven member, and a compression member adapted to slide on the oppositely inclined surfaces to move the driven member.

4. In a mechanical movement the combination of a driving member provided with oppositely inclined surfaces forming hills and valleys, a tapered driven member, and a compression member adapted to slide on the oppositely inclined surfaces of the driving member.

5. In a mechanical movement, the combination of a driving member provided with oppositely inclined wedge surfaces, a hollow tapering driven member, and a compression member mounted in the driven member and adapted to contact with the oppositely inclined surfaces of the driving member.

6. In a mechanical movement, the combination of a driving member, a driven member, coöperating means on the driving member and driven member to prevent rotation of the driven member on the driving member and yet permit the driven member to slide on the driving member, opposed hills and valleys mounted on the driven member and a fixed compression member adapted to slide upon the opposed hills and valleys of the driven member.

7. In a mechanical movement the combination of a reciprocating driving member, oppositely inclined surfaces carried by the driving member, a hollow rotary driven member, and a compression member carried by the rotary driven member and adapted to contact with the oppositely inclined surfaces of the reciprocating driving member to rotate the driven member.

8. In a mechanical movement the combination of a driving member, oppositely inclined surfaces actuated by the driving member, one or more notches formed on the edge of said inclined surfaces to coöperate with a compression member, a driven member, and a compression member carried by the driven member.

9. In an electric light socket, the combination of a driven member, oppositely inclined surfaces actuated by the driving member, said surfaces being provided with one or more notches to coöperate with a flexible member, a driving member, a flexible member carried by the driven member and electrical contacts actuated by the driven member.

10. In an electric light socket the combination of an arbor, oppositely inclined surfaces actuated by the arbor, a reciprocating hollow tapering member, a coil compression spring carried by the tapering member and adapted to coöperate with the oppositely inclined surfaces of the arbor, and electrical contacts actuated by the reciprocation of said tapering member.

11. In an electric light socket the combination of an arbor, oppositely inclined surfaces actuated by the arbor, a reciprocating hollow tapering member, a coil compression spring carried by the tapering member and adapted to coöperate with the oppositely inclined surfaces of the arbor, the edges of said surfaces being provided with one or more notches or indentations, and electrical contacts actuated by the reciprocation of said tapering member.

RALPH A. SCHOENBERG.

Witnesses:
ROSE MENK,
ALAN M. JOHNSON.